United States Patent
Thomas et al.

(10) Patent No.: US 12,142,935 B2
(45) Date of Patent: Nov. 12, 2024

(54) BASEPLATE INDUCTIVE ELECTRICAL CONNECTION

(71) Applicant: Ford Global Technologies, LLC, Dearborn, MI (US)

(72) Inventors: Galen Keith Thomas, Dearborn, MI (US); Matthew B. Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 17/716,053

(22) Filed: Apr. 8, 2022

(65) Prior Publication Data

US 2023/0115814 A1    Apr. 13, 2023

Related U.S. Application Data

(60) Provisional application No. 63/254,317, filed on Oct. 11, 2021.

(51) Int. Cl.
*H02J 50/10*    (2016.01)
*B60R 11/00*    (2006.01)
*G01D 5/14*    (2006.01)
*B60R 16/03*    (2006.01)

(52) U.S. Cl.
CPC .............. *H02J 50/10* (2016.02); *B60R 11/00* (2013.01); *G01D 5/145* (2013.01); *B60R 2011/008* (2013.01); *B60R 16/03* (2013.01)

(58) Field of Classification Search
CPC ....................................................... H02J 50/10
See application file for complete search history.

(56) References Cited

U.S. PATENT DOCUMENTS

| | | | |
|---|---|---|---|
| 8,482,250 B2 | 7/2013 | Soar | |
| 8,847,436 B2 | 9/2014 | Maxik et al. | |
| 8,890,369 B2 | 11/2014 | Baarman et al. | |
| 10,583,962 B2 | 3/2020 | Brunner et al. | |
| 10,629,016 B1* | 4/2020 | Helm | B60R 9/065 |
| 10,703,534 B2 | 7/2020 | Brunner et al. | |
| D895,966 S | 9/2020 | Brunner et al. | |
| D895,967 S | 9/2020 | Brunner et al. | |
| D896,517 S | 9/2020 | Brunner et al. | |
| D896,518 S | 9/2020 | Brunner et al. | |
| D897,103 S | 9/2020 | Brunner et al. | |
| D898,320 S | 10/2020 | Brunner et al. | |
| 10,962,218 B2 | 3/2021 | Plato et al. | |
| 10,981,696 B2 | 4/2021 | Brunner et al. | |
| D917,977 S | 5/2021 | Brunner et al. | |
| D918,584 S | 5/2021 | Brunner et al. | |

(Continued)

FOREIGN PATENT DOCUMENTS

WO    2013014878 A1    1/2013

OTHER PUBLICATIONS

US 10,947,009 B2, 03/2021, Brunner et al. (withdrawn)

*Primary Examiner* — Daniel Kessie
(74) *Attorney, Agent, or Firm* — Vichit Chea; Carlson, Gaskey & Olds, P.C.

(57) ABSTRACT

An accessory attachment system includes a baseplate that provides an attachment interface on a support surface. The baseplate is configured to engage with an accessory to secure the accessory to the support surface. The baseplate and the accessory are configured to electrically connect to each other through a wireless electrical power link.

28 Claims, 5 Drawing Sheets

(56) References Cited

U.S. PATENT DOCUMENTS

| | | | |
|---|---|---|---|
| D919,296 S | 5/2021 | Brunner et al. | |
| 11,008,136 B2 | 5/2021 | Brunner et al. | |
| 11,027,883 B1 | 6/2021 | Brunner et al. | |
| D920,671 S | 7/2021 | Brunner et al. | |
| D923,935 S | 7/2021 | Brunner et al. | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 2011/0006611 A1* | 1/2011 | Baarman | H02J 50/12 307/104 |
| 2015/0130286 A1* | 5/2015 | Kozasu | H01F 38/14 307/104 |
| 2016/0094051 A1* | 3/2016 | Soar | H02J 50/70 307/9.1 |
| 2019/0299802 A1* | 10/2019 | Neubecker | B64U 50/37 |
| 2020/0153239 A1* | 5/2020 | Pifferi | H02J 7/02 |

* cited by examiner

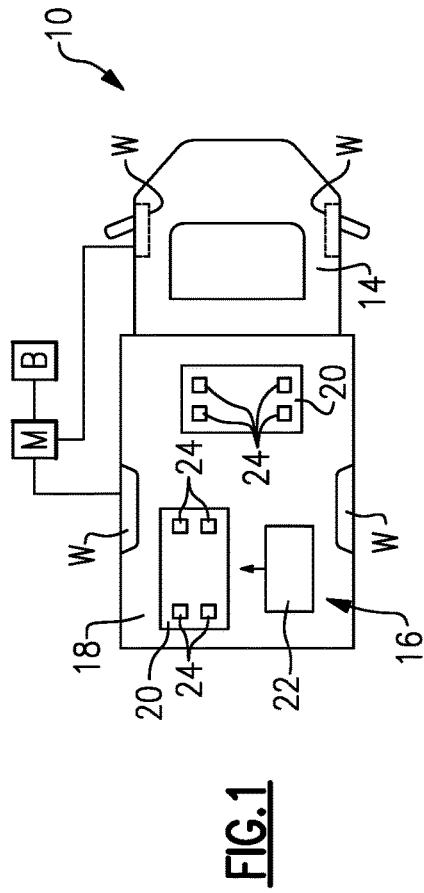
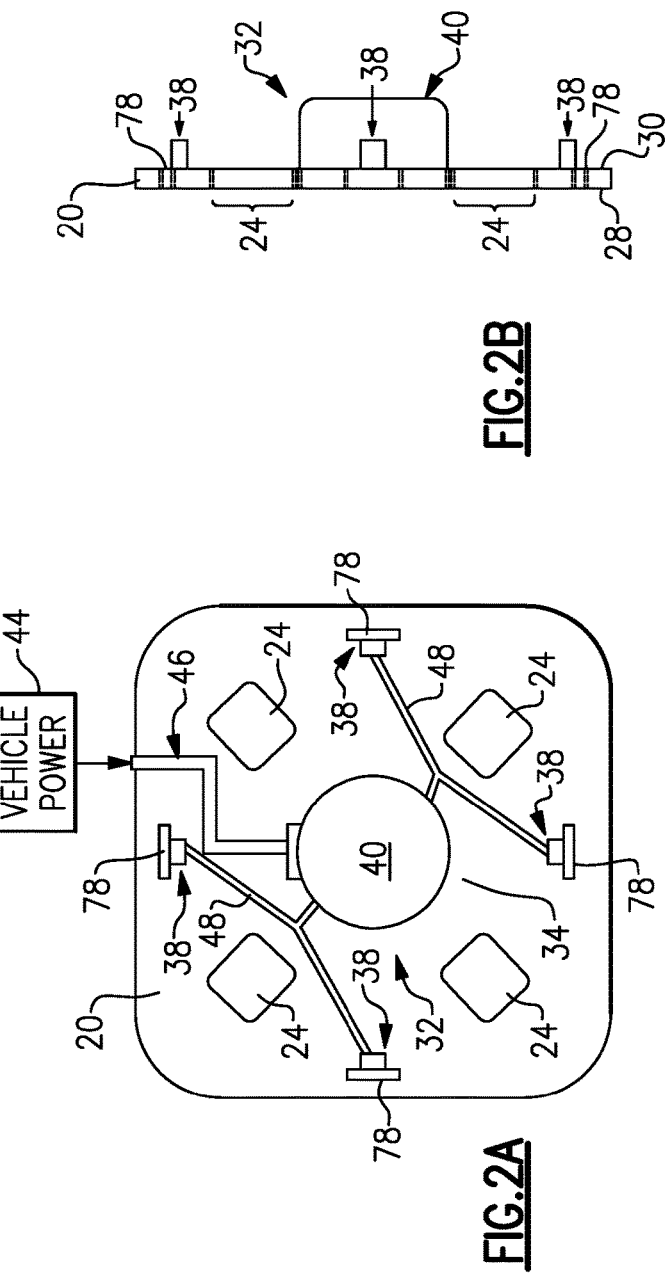

BASEPLATE INDUCTIVE ELECTRICAL CONNECTION

CROSS-REFERENCE TO RELATED APPLICATIONS

This application claims priority to U.S. Provisional Application No. 63/254,317, which was filed on 11 Oct. 2021 and is incorporated herein by reference.

TECHNICAL FIELD

This disclosure relates generally to an attachment system and, more particularly, to an attachment system that is used to secure accessories to a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to an accessory attachment system, including: a baseplate that provides an attachment interface on a support surface, the baseplate configured to engage with an accessory to secure the accessory to the support surface, the baseplate and the accessory configured to electrically connect to each other through a wireless electrical power link.

In some aspects, the techniques described herein relate to an attachment system, wherein the system includes an inductive power generation module associated with one of the baseplate and the accessory and an inductive power receiver module associated with the other of the baseplate and the accessory to provide the wireless electrical power link.

In some aspects, the techniques described herein relate to an attachment system, wherein the inductive power generation module is fixed to the baseplate and the inductive power receiver module is moveable with the accessory.

In some aspects, the techniques described herein relate to an attachment system, wherein the accessory includes a plurality of feet and the baseplate includes a plurality of apertures that are configured to receive the plurality of feet to mechanically attach the accessory to the baseplate in one of a plurality of mounting orientations.

In some aspects, the techniques described herein relate to an attachment system, wherein the accessory is configured to be selectively detachable from one mounting orientation on the baseplate such that the accessory can immediately be reattached in a different one of the mounting orientations.

In some aspects, the techniques described herein relate to an attachment system, wherein the inductive power generation module receives power from a vehicle power supply and includes power generating coils and a plurality of sensors to detect a magnetic field.

In some aspects, the techniques described herein relate to an attachment system, wherein the plurality of sensors comprise Hall effect sensors with one Hall effect sensor being positioned at each different mounting orientation on the baseplate.

In some aspects, the techniques described herein relate to an attachment system, wherein the inductive power receiver module supplies AC or DC power to the accessory and includes another set of power generating coils and a power converter.

In some aspects, the techniques described herein relate to an attachment system, wherein the system includes a magnet associated with the accessory such that when the accessory is attached to the baseplate in a desired mounting orientation, the magnet aligns with an associated one of the Hall Effect sensors.

In some aspects, the techniques described herein relate to an attachment system, wherein the magnet is integrated into a securing pin that locks the accessory to the baseplate.

In some aspects, the techniques described herein relate to an attachment system, wherein the attachment interface comprises a mechanical connection interface having a plurality of feet that are each received within one of a plurality of apertures when engaged, and wherein the baseplate is attached to a vehicle surface with an additional attachment interface that is separate from the mechanical connection interface.

In some aspects, the techniques described herein relate to an accessory attachment system, including: a baseplate that provides an attachment interface on a vehicle, the baseplate configured to engage with an accessory to secure the accessory to the vehicle, the baseplate and the accessory configured to electrically connect to each other through a wireless electrical power link that comprises an inductive power generation module associated with the baseplate and an inductive power receiver module associated with the accessory.

In some aspects, the techniques described herein relate to an attachment system, wherein the accessory includes a plurality of feet and the baseplate includes a plurality of apertures that are configured to receive the plurality of feet to mechanically attach the accessory to the baseplate in one of a plurality of mounting orientations, and wherein the accessory is configured to be selectively detachable from one mounting orientation on the baseplate such that the accessory can immediately be reattached in a different one of the mounting orientations.

In some aspects, the techniques described herein relate to an attachment system, wherein the inductive power generation module receives power from a vehicle power supply and includes power generating coils and a plurality of Hall effect sensors with one Hall effect sensor being positioned at each different mounting orientation on the baseplate, and wherein the inductive power receiver module supplies AC or DC power to the accessory and includes another set of power generating coils and a power converter.

In some aspects, the techniques described herein relate to an attachment system, wherein the system includes a magnet associated with the accessory such that when the accessory is attached to the baseplate in a desired mounting orientation, the magnet aligns with an associated one of the Hall Effect sensors to trigger activation of the wireless electrical power link.

In some aspects, the techniques described herein relate to an accessory attachment method, including: attaching an accessory to a baseplate by inserting at least one foot through at least one aperture to mechanically lock the at least one foot in place while simultaneously electrically connecting the accessory to the baseplate via a wireless electrical power link.

In some aspects, the techniques described herein relate to an attachment method, wherein the accessory includes the at least one foot and the baseplate includes the at least one aperture, and including inserting the at least one foot into the at least one aperture to mechanically attach the accessory to the baseplate in one of a plurality of mounting orientations, and wherein the accessory is configured to be selectively detachable from one mounting orientation on the baseplate such that the accessory can immediately be reattached in a different one of the mounting orientations.

In some aspects, the techniques described herein relate to an attachment method, wherein the wireless electrical power link comprises an inductive power generation module associated with the baseplate and an inductive power receiver module associated with the accessory, and including:

providing the inductive power generation module with power from a vehicle power supply;

providing the inductive power generation module with power generating coils and a plurality of Hall effect sensors;

positioning one Hall effect sensor at each different mounting orientation on the baseplate;

providing the inductive power receiver module with another set of power generating coils and a power converter; and supplying AC or DC power from the vehicle power supply to the accessory via the wireless electrical power link between the inductive power generation module and the inductive power receiver module.

In some aspects, the techniques described herein relate to an attachment method, wherein the method includes associating a magnet with the accessory such that when the accessory is attached to the baseplate in a desired mounting orientation, the magnet aligns with an associated one of the Hall effect sensors to trigger activation of the wireless electrical power link.

In some aspects, the techniques described herein relate to an attachment method, wherein the method includes installing the magnet within a securing pin, locking the accessory to the baseplate with the securing pin to activate the wireless electrical power link, and deactivating the wireless electrical power link by removing the securing pin from the baseplate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a top view of a vehicle having a cargo bed equipped with baseplates that can be used to secure an accessory according to an exemplary aspect of the present disclosure.

FIG. 2A illustrates a top view of one of the baseplates of FIG. 1 with a schematic showing of an inductive power generation module to provide electrical connection to a power module or accessory to be coupled with the baseplate.

FIG. 2B is a side view of the baseplate of FIG. 2A.

DETAILED DESCRIPTION

Figure 3:
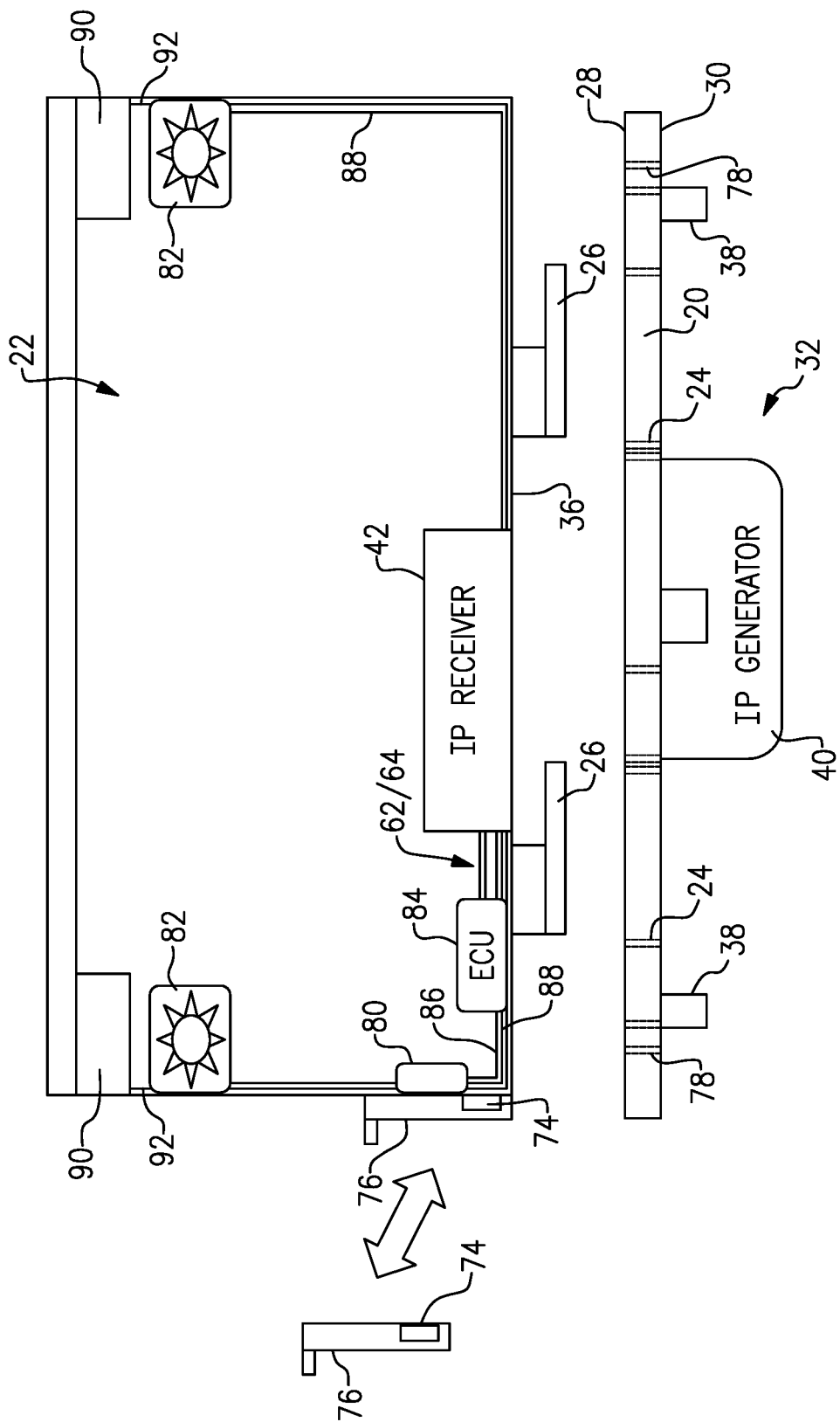
FIG. 3 illustrates a side view of a power module or accessory just prior to attachment to the baseplate.

This disclosure details a baseplate-based accessory attachment system for a vehicle or stationary application. The baseplate of the system provides an inductive power module connection interface for securing accessories/modules to a stationary support component or a vehicle such that power can be supplied to the accessories/modules. Various types of accessories or modules that require power can be secured through the inductive power module connection interface provided by a baseplate. The mounting orientation of the accessories and modules can be adjusted as needed using the same inductive power module connection interface. This provides a user with a substantially modular attachment system.

A modular inductive electrical power system disclosed here provides a new method to allow the flexibility of a durable wireless electrical power system to allow internally or externally mounted upfit based power accessories/modules within the vehicle. This system enables the possibility of a switched or automatic power-up power supply to the accessory or module upon engagement of the accessory or module within its associated accessory mounting system on the baseplate. The modular inductive electrical power system is composed of a source inductive power generation module with an integrated Hall effect triggering activation element to be located within the vehicle, and a secondary inductive power receiver module mounted appropriately within the upfit or functional accessory/module, which when aligned within the inductive field of the source module generates power to operate the upfit or functional accessory or module.

There are often situations where it would be useful for the vehicle owner to be able to switch between different upfit systems to enable different functional capabilities, or to temporarily remove an upfit accessory or module to allow the module or its contents to be used off the vehicle, then reattach the module once the desired operation or task is completed. Traditional upfit integration of elements into a vehicle ecosystem by hard wiring, and bolt on physical attachment make it difficult to easily change different types of accessories or modules for use in different applications. The subject disclosure provides an integration method that allows both the mechanical and electrical attachment to the vehicle via a quick connect/disconnect capability.

The exemplary modular inductive electrical power system is designed to complement the quick connect/disconnect mechanical system. The modular inductive electrical power system solution provides the option to create a wireless electrical power link between a fixed inductive power generation module integrated into a surface within the vehicle and a removable accessory or module containing the inductive power receiver module.

FIGS. 1-6 disclose an exemplary embodiment of the accessory attachment system that utilizes the modular inductive electrical power system. With reference to FIGS. 1 and 2A-B, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

In the exemplary embodiment, a plurality of baseplates 20 are secured directly to the floor 18 of the cargo bed 16. The baseplates 20 can have different sizes. Various accessories and/or modules 22 can be secured to the vehicle 10 by engaging one or more of the baseplates 20. The accessories/modules 22 can include a lockable storage box that holds tools, a refrigerator, etc. The accessory 22 could be a lidded lockable container that includes a compartment for storing power tools or other items that require power or data connection.

With reference now to FIGS. 2-6 and continued reference to FIGS. 1 and 2, the accessories 22 can engage one or more of the baseplates 20 using an attachment system. In the exemplary embodiment, the attachment system includes a plurality of apertures 24 and at least one foot 26 that cooperate to provide a mechanical connection interface. The baseplate 20 is attached to a vehicle surface with an additional attachment interface that is separate from the mechanical connection interface for the accessories 22.

In this example, the baseplates 20 provide the apertures 24 and the accessories 22 include a plurality of feet 26. This could be rearranged, however, such that one or all of the feet 26 extend from the baseplates 20 and the accessories 22 provide some or all of the apertures 24.

In the exemplary embodiment, when the baseplate 20 and the accessories 22 are engaged, the feet 26 are each received within one of the apertures 24 such that the feet 26 each extend from a first side 28 of the baseplate 20, through one of the apertures 24, and past an opposite, second side 30 of the baseplate 20.

Mechanical fasteners, welds, or other methods of attachment could be used to secure the baseplates 20 to the floor 18. The apertures 24 are spaced upwardly from the floor 18 by an open gap such that the feet 26 from the accessory can be easily inserted into the baseplate 20 to attach the accessory 22 to the baseplate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory having specialized tools for the second type of job.

In the subject disclosure, the accessory 22 comprises a power module comprising a lockable box that is electrically coupled to the vehicle 10 through the baseplate 20. This allows the devices within the lockable box to be powered from a vehicle power supply 44. For example, the internal device could be a refrigerated container that is powered by the vehicle 10 when the box is engaged with the baseplate 20. In another example, the devices within the lockable box could comprise rechargeable tools, which can be recharged when set within the box and coupled to the wireless charging interface between the accessory 22 and the baseplate 20.

An example of an accessory attachment method includes the step of attaching an accessory 22 to a baseplate 20 supported by the vehicle 10 by inserting at least one foot 26 through an aperture 24 to mechanically lock the at least one foot 26 in place while simultaneously electrically connecting the accessory 22 to the baseplate 20 through a wireless electrical power link 32. As shown in FIG. 2, the baseplate 20 includes four apertures 24 that are configured to receive four feet 26 (FIG. 3-4, only two feet are shown) of the accessory 22. The baseplate 20 also includes an area 34 that provides the wireless electrical power link 32. In one example, the area 34 is centrally located on the baseplate 20 and the apertures 24 are spaced apart from each other about a periphery of the baseplate 20. The accessory 22 includes a corresponding area 36 that is also centrally located on the accessory 22 and the feet 26 are spaced apart from each other about a periphery of a bottom surface of the accessory 22. The baseplate 20 engages with the accessory 22 to secure the accessory 22 to the vehicle 10 while simultaneously electrically connecting the accessory 22 to the baseplate 20 via the wireless electrical power link 32.

In one example, the wireless electrical power link 32 comprises an inductive power generation module 40 associated with one of the baseplate 20 and the accessory 22 and an inductive power receiver module 42 associated with the other of the baseplate 20 and the accessory 22. In the example shown in FIGS. 2A-B, the inductive power generation module 40 is fixed to the baseplate 20 and the inductive power receiver module 42 is mounted to the accessory 22 such that the inductive power receiver module 42 is moveable with the accessory 22. In one example, the central area 34 of the baseplate 20 includes the inductive power generation module 40, and the central area 36 of the accessory 22 includes the inductive power receiver module 42.

When the accessory 22 is attached to the baseplate 20, the feet 26 are inserted into the corresponding apertures 24 to mechanically attach the accessory 22 to the baseplate 20 in one of a plurality of mounting orientations. The accessory 22 is configured to be selectively detachable from one mounting orientation on the baseplate 20 such that the accessory 22 can immediately be reattached in a different one of the mounting orientations. In each of the different mounting orientations the inductive power generation module 40 is generally aligned with the inductive power receiver module 42.

Figure 5:
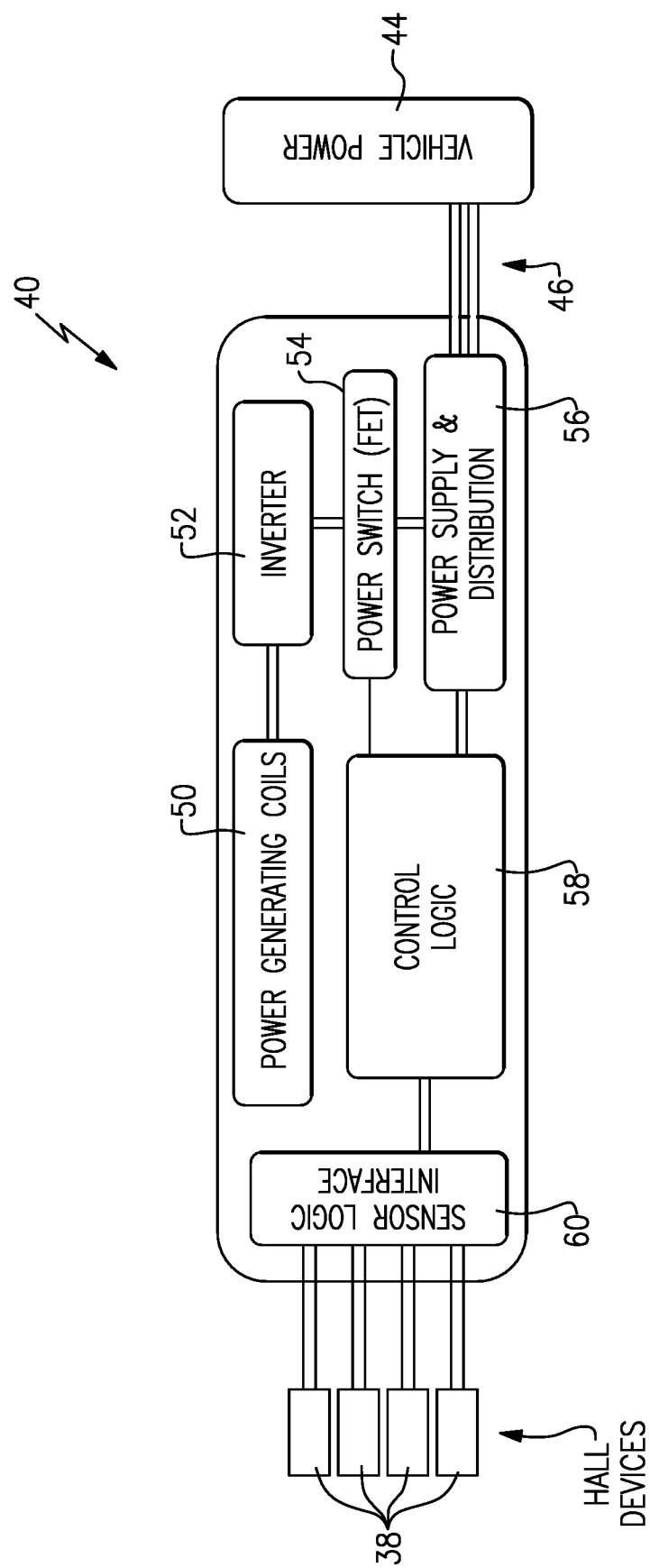
FIG. 5 illustrates an inductive power generation module block diagram.

In the example shown in FIGS. 2A-2B, the inductive power generation module 40 receives power from a vehicle power supply 44 via a power distribution harness 46. Signal lines 48 connect the inductive power generation module 40 to a plurality of sensors 38 that are used to detect a magnetic field. In one example, the sensors 38 comprise Hall effect sensors. One Hall effect sensor 38 is positioned at each different mounting orientation on the baseplate 20. The inductive power generation module 40 further includes power generating coils 50, an inverter 52, a power switch (FET) 54, a power supply and distribution 56, and control logic 58 (see FIG. 5). The control logic 58 interfaces with a sensor logic interface 60 associated with the sensors 48, the power supply and distribution 56, and the power switch 54 as shown in FIG. 5. The power supply and distribution 56 is connected to the vehicle power supply 44 as shown.

Figure 6:
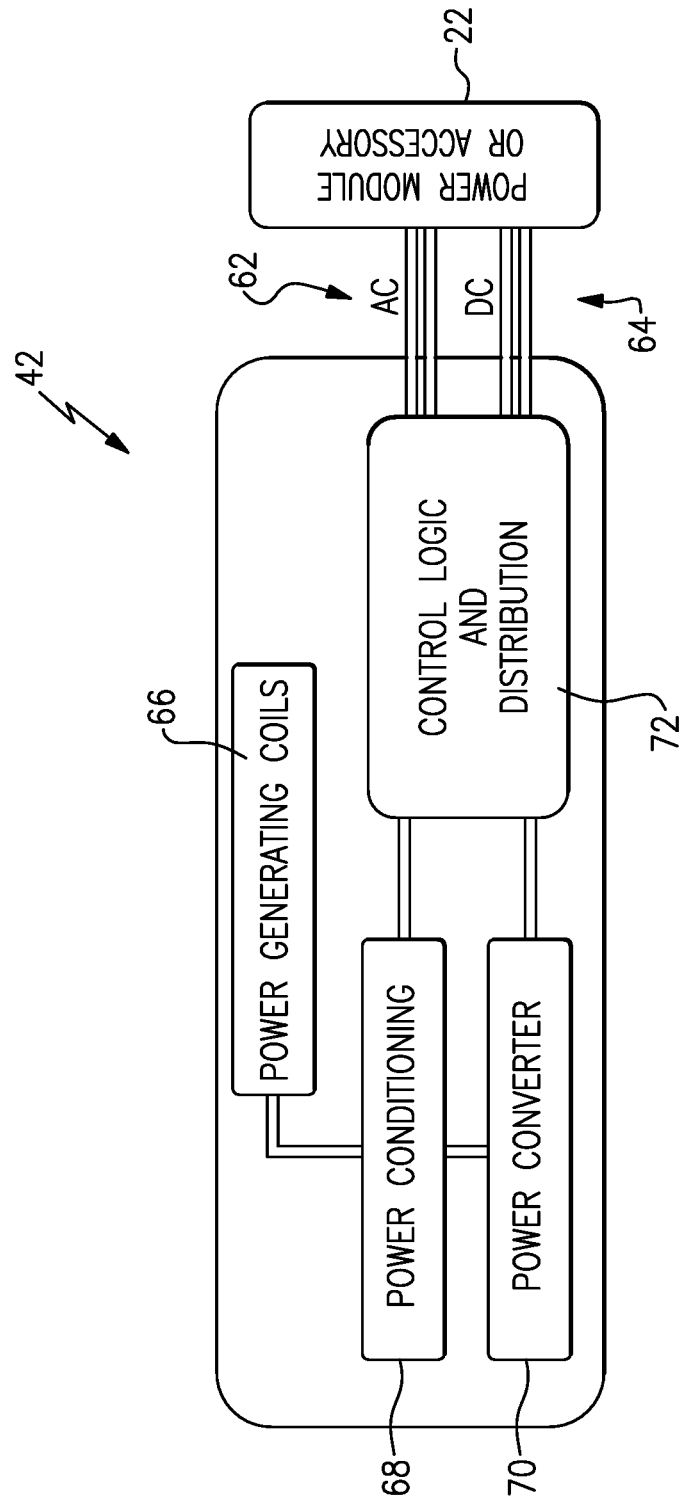
FIG. 6 illustrates an inductive power receiver module block diagram.

In one example, the inductive power receiver module 42 supplies AC power 62 or DC power 64 to the accessory 22. The inductive power receiver module 42 further includes power generating coils 66, power conditioning 68, a power converter 70, and control logic and distribution 72 as shown in FIG. 6. The control logic and distribution 72 interfaces with the power converter 70, power conditioning 68 and accessory 22 as shown.

Figure 4:
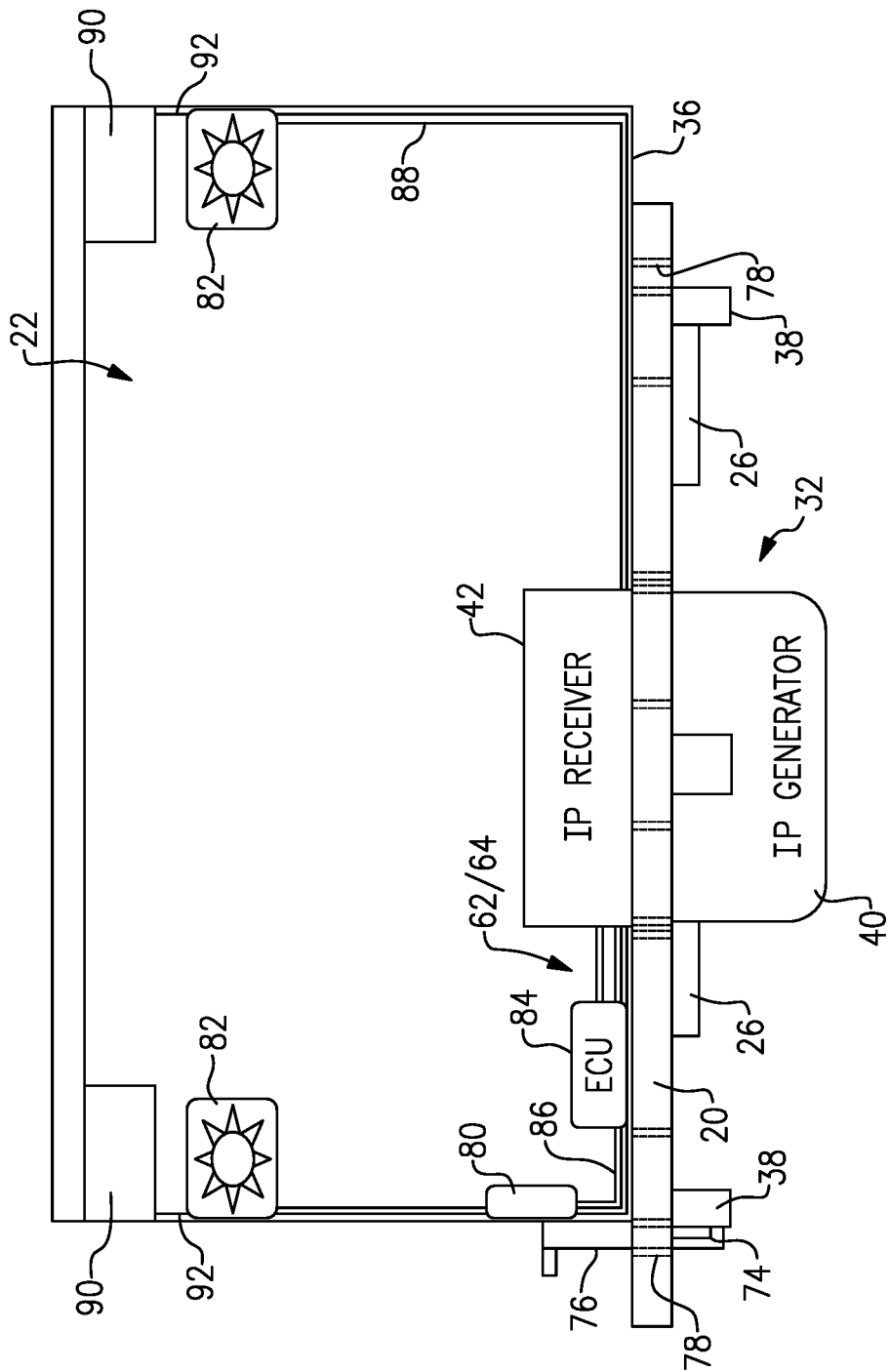
FIG. 4 illustrates a side view of the power module or accessory of FIG. 3 attached to the baseplate.

In one example, a magnet 74 is associated with the accessory 22 such that when the accessory 22 is attached to the baseplate 20 in a desired mounting orientation as shown in FIG. 4, the magnet 74 aligns with an associated one of the Hall effect sensors 38. In one example, the magnet 74 is integrated into a securing pin 76 (best seen in FIG. 3) that extends through an opening 78 the baseplate 20 in a position that is immediately adjacent to the accessory 22. Once the magnet 74 is aligned with the Hall effect sensor 38, the inductive power generation module activation is triggered.

As known, the Hall effect sensor 38 is a type of sensor which detects the presence and magnitude of a magnetic field using the Hall effect. The output voltage of the Hall effect sensor 38 is directly proportional to the strength of the field. The inductive power generation module activation is initiated by an installation of the power module or accessory 22 in a mounting orientation on the baseplate 20 that aligns the inductive power receiver module 42 with the inductive power generation module 40. Activation of the wireless electrical power link 32 is completed once the inductive power generation module 40 recognizes the inductive power receiver module 42 has been installed on the baseplate 20. Different triggering devices can be used for activation of the wireless electrical power link 32. For example, magnetic interfaces or Qi communication interfaces could be used.

In the subject example, the triggering device comprises the securing member 76 with the integrated magnet 74. As the inductive power generation module 40 is set into the mounting location and moved into position, the securing member 76 is dropped into place to prevent movement or removal of the module. In other words, the securing member 76 can serve as a lock 80 to prevent the accessory 22 from being removed from the baseplate 20. The securing member 76 also includes the integrated magnet 74 to serve as the triggering device. This magnet 74 is located within the securing member 76 such that as the securing member 76 is dropped into place, a field naturally generated by the magnet 74 is aligned with the respective Hall effect sensor 38, which detects the presence of the magnet 74 and the resulting change in output voltage from the device is detected by sensor logic 60 and the inductive power generator control logic 58 enables power delivery to the power inverter 52 and subsequent generating coils 50. Once activated, the generating module 40 generates the relevant field which excites the receiver module coils 66, thus generating the desired output voltage which is conditioned at 68 and delivered as either AC 62 or DC 64 voltage to the associated accessory 22 for use in powering internal devices 82 within the accessory 22. When the securing member 76 is lifted, the generator output is disabled, and the accessory 22 can be removed.

The accessory 22 includes an ECU 84 that cooperates with the inductive power receiving module 42 to deliver/communicate the power/signals to the lock 80 and internal devices 82. A first signal line 86 communicates with the lock 80 and a second signal line 88 communicates with the internal devices 82. In the example shown in FIGS. 3-4, the accessory comprises a lockable box that includes multiple internal devices 82 that require power. In one example, the box includes one or more door actuators 90 that can be unlocked once the wireless electrical power link 32 is activated. In this example, a third signal line 92 communicates with the door actuators 90.

The system of the subject disclosure provides custom wireless electrical power quick connect/disconnect capability for traditional and upfit based vehicle modules. This system can be used to connect modules mounted in both protected and external surfaces within the vehicle 10. It provides for multiple mounting locations for a single module and allows for flexibility of configuration or location of multiple modules on the mounting surface. The inductive power generation module 40 is designed to support multi-directional mounting options and includes Hall sensors 38 to support each of the securing member port locations. A trigger signal on any of the Hall effect sensors 38 will activate the output stages of the generating module 40. Symmetry of the physical mounting capability for power modules/accessories 22 is important to ensure the alignment of the inductive power generating module 40 and the inductive power receiving module 42 in all possible orientations and optimize transfer efficiency.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An accessory attachment system, comprising:
a baseplate that provides an attachment interface on a support surface, wherein the attachment interface comprises a plurality of mounting apertures that are spaced apart from each other on the support surface, and wherein the baseplate includes at least one lock aperture that is spaced apart from the plurality of mounting apertures;
the baseplate configured to engage with an accessory to secure the accessory to the support surface, wherein the accessory includes at least one foot to be received within one of the plurality of mounting apertures;
the baseplate and the accessory configured to electrically connect to each other through a wireless electrical power link; and
at least one lock feature associated with the accessory, wherein the at least one lock feature is inserted into the at least one lock aperture to prevent the accessory from being removed from the baseplate and to activate the wireless electrical power link.

2. The accessory attachment system of claim 1, including an inductive power generation module associated with one of the baseplate and the accessory and an inductive power receiver module associated with the other of the baseplate and the accessory to provide the wireless electrical power link.

3. The accessory attachment system of claim 2, wherein the inductive power generation module is fixed to the baseplate and the inductive power receiver module is moveable with the accessory.

4. The accessory attachment system of claim 1, wherein the at least one foot comprises a plurality of feet, and wherein the plurality of mounting apertures are configured to receive the plurality of feet to mechanically attach the accessory to the baseplate in one of a plurality of mounting orientations, wherein each foot inserted into a respective mounting aperture extends from a first side of the baseplate, through the respective mounting aperture, and past an opposite second side of the baseplate, and wherein the accessory is configured to be selectively detachable from one mounting orientation on the baseplate such that the accessory can immediately be reattached in a different one of the plurality of mounting orientations.

5. The accessory attachment system of claim 2, wherein the at least one foot comprises a plurality of feet, and wherein the plurality of mounting apertures are configured to receive the plurality of feet to mechanically attach the accessory to the baseplate in one of a plurality of mounting orientations, and wherein the inductive power generation module receives power from a vehicle power supply and includes power generating coils and a plurality of sensors to detect a magnetic field, wherein at least one sensor of the plurality of sensors is positioned at each lock aperture.

6. The accessory attachment system of claim 5, wherein the plurality of sensors comprise Hall effect sensors with one Hall effect sensor being positioned at each lock aperture such that each different mounting orientation on the baseplate can be identified.

7. The accessory attachment system of claim 6, wherein the inductive power receiver module supplies AC or DC power to the accessory and includes another set of power generating coils and a power converter.

8. An accessory attachment system, comprising:
a baseplate that provides an attachment interface on a support surface, the baseplate configured to engage with an accessory to secure the accessory to the support surface, the baseplate and the accessory configured to electrically connect to each other through a wireless electrical power link;
an inductive power generation module associated with one of the baseplate and the accessory and an inductive power receiver module associated with the other of the baseplate and the accessory to provide the wireless electrical power link, wherein the inductive power generation module receives power from a vehicle power supply and includes power generating coils and a plurality of sensors to detect a magnetic field;
wherein the plurality of sensors comprise Hall effect sensors with one Hall effect sensor being positioned at each different mounting orientation on the baseplate;
wherein the inductive power receiver module supplies AC or DC power to the accessory and includes another set of power generating coils and a power converter; and
a magnet associated with the accessory such that when the accessory is attached to the baseplate in a desired mounting orientation, the magnet aligns with an associated one of the Hall Effect sensors, wherein the magnet is integrated into a securing pin that locks the accessory to the baseplate.

9. The accessory attachment system of claim 4, wherein the attachment interface comprises a mechanical connection interface having the plurality of feet that are each received within one of the plurality of mounting apertures when engaged, and wherein the baseplate is attached to a vehicle surface with an additional attachment interface that is separate from the mechanical connection interface such that the plurality of mounting apertures are spaced upwardly from the vehicle surface by an open gap.

10. An accessory attachment system, comprising:
a baseplate that provides an attachment interface on a vehicle, the baseplate configured to be mounted within a cargo area of the vehicle and to engage with an accessory to secure the accessory to the vehicle, wherein the baseplate includes a plurality of apertures that each extend through a thickness of the baseplate from a first side of the baseplate to an opposite second side of the baseplate that is spaced from a cargo area surface by an open gap;
wherein the accessory has at least one foot to be received within an aperture of the plurality of apertures, and wherein each foot inserted into a respective aperture extends through the thickness of the baseplate and at least partially extends into the open gap;
the baseplate and the accessory configured to electrically connect to each other through a wireless electrical power link that comprises an inductive power generation module associated with the baseplate and an inductive power receiver module associated with the accessory; and
wherein the accessory comprises a container that provides power to one or more components via the wireless electrical power link.

11. The accessory attachment system of claim 10, wherein the at least one foot comprises a plurality of feet, and wherein the plurality of apertures are configured to receive the plurality of feet to mechanically attach the accessory to the baseplate in one of a plurality of mounting orientations, and wherein each foot inserted into the respective aperture extends from the first side of the baseplate, through the respective aperture, and past the opposite second side of the baseplate, and wherein the baseplate is attached to the cargo area surface of the vehicle with an additional attachment interface that is separate from the attachment interface such that the opposite second side of the baseplate is spaced upwardly from the cargo area surface by the open gap, and wherein the accessory is configured to be selectively detachable from one mounting orientation on the baseplate such that the accessory can immediately be reattached in a different one of the plurality of mounting orientations.

12. The accessory attachment system of claim 11, wherein the inductive power generation module receives power from a vehicle power supply and includes power generating coils and a plurality of Hall effect sensors that are associated with the baseplate such that each different mounting orientation on the baseplate can be identified, and wherein the inductive power receiver module supplies AC or DC power to the accessory and includes another set of power generating coils and a power converter.

13. The accessory attachment system of claim 12, including a magnet associated with the accessory such that when the accessory is attached to the baseplate in a desired mounting orientation, the magnet aligns with an associated one of the plurality of Hall Effect sensors to trigger activation of the wireless electrical power link.

14. An accessory attachment method, comprising:
providing a plurality of mounting apertures on a baseplate;
providing a plurality of lock apertures on the baseplate that are spaced apart from the plurality of mounting apertures;
attaching an accessory to the baseplate by inserting at least one foot through at least one mounting aperture of the plurality of mounting apertures to mechanically lock the at least one foot in place while simultaneously electrically connecting the accessory to the baseplate via a wireless electrical power link;
inserting at least one lock feature into one of the plurality of lock apertures; and
in response to the at least one lock feature being inserted into an associated lock aperture, the accessory is prevented from being removed from the baseplate and the wireless electrical power link is activated.

15. An accessory attachment method, comprising:
attaching an accessory to a baseplate by inserting at least one foot through at least one aperture to mechanically lock the at least one foot in place while simultaneously electrically connecting the accessory to the baseplate via a wireless electrical power link triggered by interaction between a first power link component associated with the baseplate and a second power link component associated with the accessory;

locking and unlocking the accessory to the baseplate via the wireless electrical power link;

and further including:

providing the baseplate with a plurality of apertures that each extend through a thickness of the baseplate from a first side of the baseplate to an opposite second side of the baseplate;

attaching the baseplate to a vehicle surface such that the opposite second side of the baseplate is spaced upwardly from the vehicle surface by an open gap;

providing at least one accessory having at least one foot; and attaching the accessory to the baseplate such that each foot inserted into a respective aperture extends from the first side of the baseplate, through the respective aperture, and past the opposite second side of the baseplate, wherein the accessory is attachable to the baseplate in one of a plurality of mounting orientations, and wherein the accessory is configured to be selectively detachable from one mounting orientation on the baseplate such that the accessory can immediately be reattached in a different one of the plurality of mounting orientations.

16. The accessory attachment method of claim 14, wherein the at least one foot comprises a plurality of feet and wherein the plurality of mounting apertures are configured to receive the plurality of feet to mechanically attach the accessory to the baseplate in one of a plurality of mounting orientations, and wherein the wireless electrical power link comprises an inductive power generation module associated with the baseplate and an inductive power receiver module associated with the accessory, and including providing the inductive power generation module with power from a vehicle power supply, providing the inductive power generation module with power generating coils and a plurality of Hall effect sensors, positioning one Hall effect sensor at each lock aperture such that each different mounting orientation on the baseplate can be identified, providing the inductive power receiver module with another set of power generating coils and a power converter, and supplying AC or DC power from the vehicle power supply to the accessory via the wireless electrical power link between the inductive power generation module and the inductive power receiver module.

17. The accessory attachment method of claim 14, wherein the wireless electrical power link comprises an inductive power generation module associated with the baseplate and an inductive power receiver module associated with at least one accessory, and wherein the inductive power generation module receives power from a vehicle power supply and includes power generating coils and a plurality of sensors to detect a magnetic field, wherein at least one sensor of the plurality of sensors is associated with each lock aperture of the plurality of mounting apertures, and including associating a magnet with the at least one accessory such that when the at least one accessory is attached to the baseplate in a desired mounting orientation, the magnet aligns with an associated one of the plurality of sensors to trigger activation of the wireless electrical power link.

18. An accessory attachment method, comprising:

attaching an accessory to a baseplate by inserting at least one foot through at least one aperture to mechanically lock the at least one foot in place while simultaneously electrically connecting the accessory to the baseplate via a wireless electrical power link;

associating a magnet with the accessory such that when the accessory is attached to the baseplate in a desired mounting orientation, the magnet aligns with an associated Hall effect sensor to trigger activation of the wireless electrical power link; and installing the magnet within a securing pin, locking the accessory to the baseplate with the securing pin to activate the wireless electrical power link, and deactivating the wireless electrical power link by removing the securing pin from the baseplate.

19. The accessory attachment method of claim 14, wherein the at least one foot comprises a plurality of feet, and wherein the accessory comprises a container that includes a lid to enclose a compartment for storing power tools that access power through the wireless electrical power link, and including:

positioning the baseplate within a work area such that a first side of the baseplate is spaced from a work area surface by a gap;

inserting the plurality of feet through mounting apertures such that a distal end of each foot extends through a thickness of the baseplate and into the gap to secure the container to the baseplate; and locking the lid to the container via the wireless electrical power link to prevent access to the compartment.

20. The accessory attachment system of claim 1, and wherein the baseplate comprises a plate body configured to be mounted within a work area, and wherein each mounting aperture extends through a thickness of the baseplate from a first side of the baseplate to an opposite second side of the baseplate that is spaced from a work area surface by a gap, and wherein the at least one foot is received within the one of the plurality of mounting apertures to secure the accessory to the baseplate, and wherein each foot extends through the thickness of the baseplate and at least partially extends into the gap, and wherein the at least one lock feature comprises a securing pin that is inserted through the at least one lock aperture to lock the accessory to the baseplate.

21. The accessory attachment system of claim 1, wherein the accessory comprises a container that includes a lid to enclose a compartment for storing components that access power through the wireless electrical power link, and wherein the at least one lock feature comprises a securing pin that is inserted through the at least one lock aperture to lock the accessory to the baseplate, and including an additional lock feature that is configured to lock the lid to the container to prevent access to the compartment.

22. The accessory attachment system of claim 5, including at least one magnet associated with the accessory such that when the accessory is attached to the baseplate in a desired mounting orientation, the magnet aligns with an associated one of the plurality of sensors to trigger inductive power generation module activation.

23. The accessory attachment system of claim 10, wherein the container includes a lid to enclose a compartment for storing the one or more components that access power through the wireless electrical power link.

24. The accessory attachment system of claim 23, including at least one locking actuator that is configured to lock the lid to the container via the wireless electrical power link to prevent access to the compartment.

25. The accessory attachment system of claim 10, wherein the one or more components comprises a refrigerator component.

26. The accessory attachment system of claim 10, wherein the baseplate includes a plurality of lock apertures that are spaced apart from the plurality of apertures, and including at least one lock feature that is inserted into one of the plurality of lock apertures and is configured to lock the accessory to the baseplate via the wireless electrical power link.

27. The accessory attachment system of claim 1, wherein the at least one lock aperture comprises a plurality of lock apertures that are spaced from the plurality of mounting apertures.

28. The accessory attachment method of claim 15, wherein one of the first power link and the second power link comprises a sensor and the other of the first power link and the second power link comprises a magnet.

\* \* \* \* \*